United States Patent
Manzi, Jr. et al.

[11] Patent Number: 5,966,525
[45] Date of Patent: Oct. 12, 1999

[54] ACOUSTICALLY IMPROVED GAS TURBINE BLADE ARRAY

[75] Inventors: Robert J. Manzi, Jr., Rocky Hill; Douglas C. Mathews, Marlborough; Soter P. Slomski, Vernon; Johan van Achterberg, South Windsor, all of Conn.

[73] Assignee: United Technologies Corporation, Hartford, Conn.

[21] Appl. No.: 08/835,282

[22] Filed: Apr. 9, 1997

[51] Int. Cl.⁶ ............................... F01D 5/12; B64C 11/18; G06F 17/50
[52] U.S. Cl. ................. 395/500.29; 415/119; 416/223 R
[58] Field of Search ........................ 364/512; 395/500.29, 395/500.28, 500.3

[56] References Cited

U.S. PATENT DOCUMENTS

| | | | |
|---|---|---|---|
| 3,006,603 | 10/1961 | Caruso et al. | 253/39 |
| 3,058,528 | 10/1962 | Hiersch | 170/159 |
| 3,398,866 | 8/1968 | LaFlame et al. | 222/333 |
| 3,536,417 | 10/1970 | Stiefel et al. | 416/223 |
| 4,253,800 | 3/1981 | Segawa et al. | 416/203 |
| 4,474,534 | 10/1984 | Thode | 416/203 |
| 4,538,693 | 9/1985 | Sugio et al. | 416/203 |
| 4,729,714 | 3/1988 | Wrobel | 415/119 |
| 4,732,532 | 3/1988 | Schwaller et al. | 415/119 |
| 4,883,240 | 11/1989 | Adamson et al. | 244/69 |
| 4,923,365 | 5/1990 | Rollwage | 415/119 |
| 5,000,660 | 3/1991 | Van Houten et al. | 416/203 |
| 5,266,007 | 11/1993 | Bushnell et al. | 416/178 |
| 5,478,201 | 12/1995 | Amr | 415/206 |
| 5,478,205 | 12/1995 | Chou et al. | 416/178 |
| 5,537,861 | 7/1996 | Seitelman et al. | 73/66 |

FOREIGN PATENT DOCUMENTS 2 046 360  11/1980  United Kingdom ........................ 29/66

OTHER PUBLICATIONS

Pickett, Gordon F., "The Prediction of the Spectral Content of Combination Tone Noise"AIAA Paper No. 71–730, Presented at the AIAA/SAE 7$^{th}$ Population tone Specialist Conference, Salt Lake City, Utah Jun. 14–18, 1971.

Kesler, J.D., and Pickett, G. F., "Application of Theoretical Acoustics to the Reduction of Jet Engine Noise", J. Phys. D. Appl. Phys., vol. 5, 1972.

"Europe Eyes Further Noise Control Studies", John D. Morrocco/Derby, England—*Aviation Week & Space Technology*/Mar. 24, 1997.

"Axial Flow Compressor Noise Studies", Tyler & Sofrin, *Transactions of the S.A.E.*, vol. 70, pp. 309–332, 1962.

"Pratt & Whitney Aircraft Experience in Compressor–Noise Reduction", Sofrin & McCann, 72nd Meeting, Los Angeles, California, Nov. 2–5, 1996.

*Primary Examiner*—Kevin J. Teska
*Assistant Examiner*—Hugh Jones
*Attorney, Agent, or Firm*—Kenneth C. Baran

[57] ABSTRACT

The blades (38) of a gas turbine engine fan rotor (32) are uniquely distributed in the rotor hub (48) so that combination tone noise attributable to one or more physical nonuniformities in the blades is mitigated. The invention recognizes that the frequency spectrum of the combination tone noise includes both decay prone harmonics and decay resistant harmonics and that allocation of acoustic energy into the decay prone harmonics and out of the decay resistant harmonics is effective for mitigating combination tone noise. In particular, the blades are distributed so that the spatial or circumferential spectrum of the physical nonuniformity is dominated by circumferential harmonics whose order is no greater than the order of the highest decay prone harmonic of the combination tone noise spectrum.

19 Claims, 11 Drawing Sheets

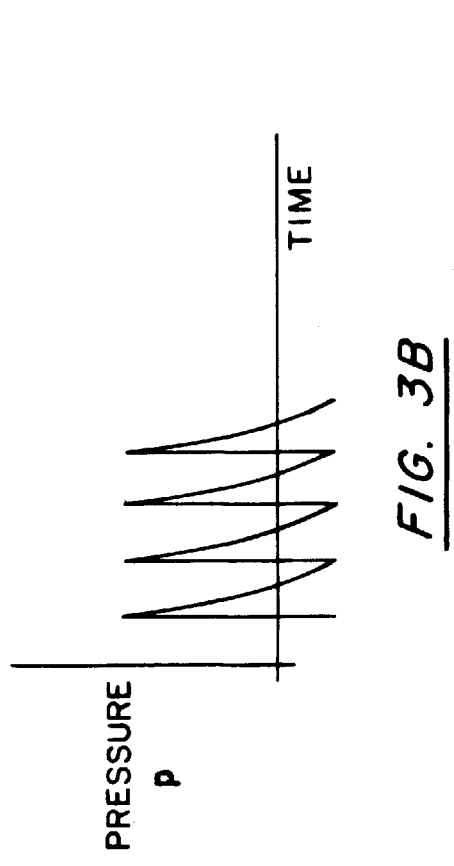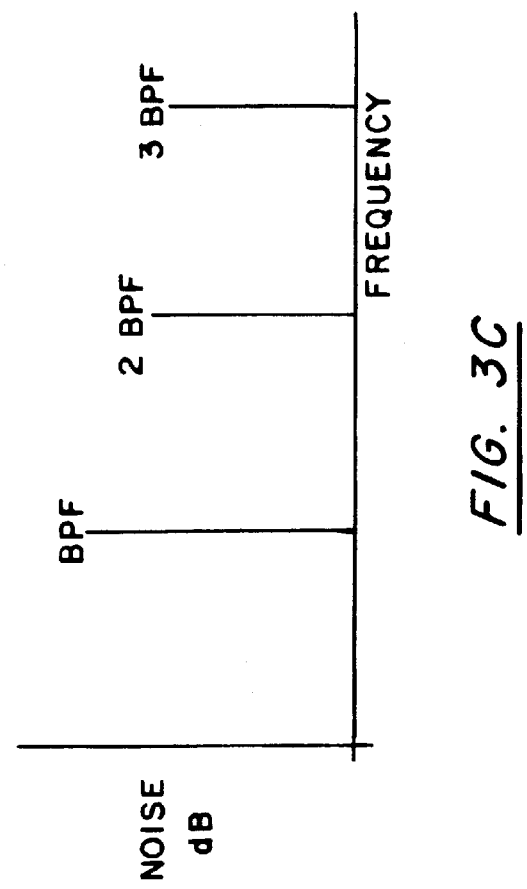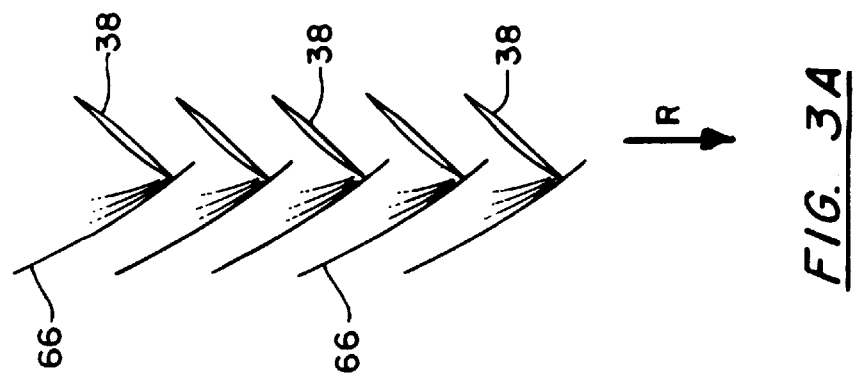

| BLADE IDENTIFIER | STAGGER ANGLE (DEGREES) | BLADE POSITION FOR NOISE REDUCTION | BLADE POSITION WITHOUT CONSIDERATION FOR NOISE REDUCTION (PRIOR ART) |
|---|---|---|---|
| B1 | 25.4 | 4 | 3 |
| B2 | 25.5 | 3 | 6 |
| B3 | 25.5 | 15 | 12 |
| B4 | 25.5 | 16 | 14 |
| B5 | 25.55 | 14 | 11 |
| B6 | 25.6 | 2 | 5 |
| B7 | 25.6 | 5 | 20 |
| B8 | 25.65 | 13 | 21 |
| B9 | 25.7 | 6 | 8 |
| B10 | 25.7 | 17 | 9 |
| B11 | 25.75 | 1 | 1 |
| B12 | 25.8 | 12 | 17 |
| B13 | 25.8 | 22 | 19 |
| B14 | 25.85 | 7 | 13 |
| B15 | 25.85 | 11 | 22 |
| B16 | 25.9 | 10 | 18 |
| B17 | 25.95 | 8 | 2 |
| B18 | 25.95 | 21 | 4 |
| B19 | 26. | 18 | 10 |
| B20 | 26.05 | 20 | 16 |
| B21 | 26.15 | 9 | 7 |
| B22 | 26.15 | 19 | 15 |

*FIG. 6*

NORMALIZED SOUND PRESSURE DISTRIBUTION

NORMALIZED SOUND PRESSURE DISTRIBUTION

ACOUSTICALLY IMPROVED GAS TURBINE BLADE ARRAY

TECHNICAL FIELD

This invention pertains to the mitigation of combination tone noise emitted by a rotating blade array, particularly the rotating fan blade array of a gas turbine engine.

BACKGROUND OF THE INVENTION

Gas turbine engines of the type used for aircraft propulsion include a fan rotor which comprises an array of fan blades recessed within an engine intake duct and projecting radially outwardly from a central hub. During engine operation, the hub and blades rotate about a longitudinally extending axis to pressurize a stream of air flowing through the duct. At sufficiently high rotational speeds, the radially outermost portions of the fan blades operate supersonically so that the leading edge of each blade generates an aerodynamic shock. These shocks propagate forwardly, i.e. opposite to the direction of flow of the air stream, and exit from the intake duct.

In practice, each blade in the array differs slightly from the other blades in the array due to allowable manufacturing and installation tolerances. Because of these blade-to-blade nonuniformities, the shocks are nonuniformly oriented and propagate at different speeds. As a result, the shocks interact within the intake duct to produce a complex, time varying air pressure pattern which repeats once per rotor revolution. The frequency spectrum of this pressure pattern includes a fundamental frequency of once per fan rotor revolution as well as multiple higher order harmonics of the fundamental frequency. The noise associated with the pressure pattern is known as combination tone noise or multiple pure tone noise and, when it propagates forwardly beyond the confines of the intake duct, can be objectionable to airplane cabin occupants and to residents of communities in the vicinity of airports.

Combination tone noise is likely to become an increasingly prevalent problem since the fans of modern engines have a larger diameter than those of earlier generation engines and therefore operate at slower rotational speeds. In addition, modern engines often employ fewer fan blades than earlier generation engines. Both of these trends, slower rotational speeds and reduced blade quantity, result in the acoustic energy of the combination tone noise being concentrated at lower frequencies. Since acoustic energy at low frequencies is less readily attenuable than acoustic energy at high frequencies, current trends in the gas turbine industry appear likely to exacerbate the problem of combination tone noise.

One possible way to address the problem of combination tone noise is to employ sound attenuating material in the fuselage of the aircraft to shield occupants from the noise. However the sound attenuating material adds cost and weight to the aircraft and can be difficult to incorporate if the need for the material was not anticipated early in the design of the aircraft. Moreover, the use of sound attenuating material in the aircraft does nothing to alleviate the community noise problem.

Another possible way to address combination tone noise is to minimize the magnitude of the blade-to-blade nonuniformities by imposing more stringent manufacturing tolerances. However this approach is undesirable since it escalates the cost of blade manufacture. The adoption of stricter tolerances also fails to remedy combination tone noise generated by an existing fan comprised of blades manufactured prior to the adoption of those tolerances unless the engine owner refurbishes the existing blades or replaces them with newly manufactured blades—expensive and unappealing actions if the existing blades are otherwise serviceable. The unconditional imposition of stricter manufacturing standards may also be undesirable because excessive blade-to-blade uniformity can make the fan susceptible to flutter, a potentially destructive aeroelastic phenomenon.

Minimization of blade to blade nonuniformity might also be achieved by carefully selecting a subset of nearly uniform blades from a larger set of less uniform blades. However this approach relies on the presence of a sufficiently large inventory of blades from which the subset can be selected. An engine manufacturer is unlikely to possess such an inventory, and an engine owner, who may be faced with the occasional need to replace several damaged blades in a rotor, is almost certain not to possess an adequate inventory. Even if such an inventory was available, the requirement to select a nearly uniform subset of blades slows the pace of assembly operations and, without additional selection criteria, introduces the possibility of flutter referred to above.

It is seen, therefore, that existing methods for addressing the problem of combination tone noise are unsatisfactory and that a simple, effective and economical way for mitigating combination tone noise is needed.

SUMMARY OF THE INVENTION

It is, therefore, an object of the present invention to mitigate combination tone noise emissions from the fan blade arrays of turbine engines and to do so in a way which addresses both community and aircraft cabin noise concerns.

It is an additional object of the invention to mitigate combination tone noise without significantly increasing the cost of engine manufacture or complicating engine assembly operations.

It is still another object of the invention to mitigate combination tone is noise in a way which is readily and economically applicable to existing turbine engine fan blade arrays.

It is a further object of the invention to mitigate combination tone noise without introducing the risk of fan flutter.

This invention is based in part on the recognition that the frequency spectrum of combination tone noise includes low order, decay prone harmonics which decay within the engine intake duct as well as higher order, decay resistant harmonics which propagate beyond the duct, and that significant mitigation of combination tone noise is achievable by forcing acoustic energy out of the decay resistant harmonics and into the decay prone harmonics. The invention is further based in part on the recognition that a population of fan blades, which exhibit physical nonuniformities, can be distributed in a hub to effect the aforementioned allocation of acoustic energy among the combination tone noise harmonics.

According to the invention a population of fan blades that exhibits a physical blade-to-blade nonuniformity is distributed in a hub so that the circumferential spectrum of the nonuniformity is dominated by circumferential harmonics whose order does not exceed that of the highest order decay prone harmonic of the combination tone noise frequency spectrum.

In one embodiment of the invention, the physical nonuniformity is the leading edge pitch angle of the blades and the circumferential nonuniformity spectrum is dominated by circumferential harmonics of order no greater than two.

In another embodiment of the invention, the dominance of desirable, low order circumferential harmonics is effected by distributing the blades so that a weighted sum of the amplitudes of the undesirable, higher order circumferential harmonics is no greater than a specified threshold.

The invention is advantageous in that it defeats combination tone noise at its source, and therefore addresses both community noise concerns and airplane cabin noise concerns. Because the invention relies on the judicious distribution of blades rather than on stringent manufacturing tolerances, it is cost effective and is applicable to existing blade arrays as well as newly assembled blade arrays. Moreover, because the invention manipulates the circumferential spectrum of the physical nonuniformity rather than attempting to minimize the nonuniformity, there is little accompanying risk of fan flutter.

The foregoing features and advantages and the operation of the invention will become more apparent in light of the following description of the best mode for carrying out the invention and the accompanying drawings.

BRIEF DESCRIPTION OF THE DRAWINGS

FIGS. 3A, 3B and 3C are, respectively, a schematic, developed view of a portion of an ideal fan blade array showing aerodynamic shocks generated by each blade, a graph of a pressure signal associated with the shocks and a spectral diagram showing the frequency spectrum of the pressure signal.

FIG. 6 is a table illustrating the stagger angle of a population of fan blades and showing the positions of those blades in a fan hub according to the present invention and according to the prior art.

BEST MODE FOR CARRYING OUT THE INVENTION

Figure 1:
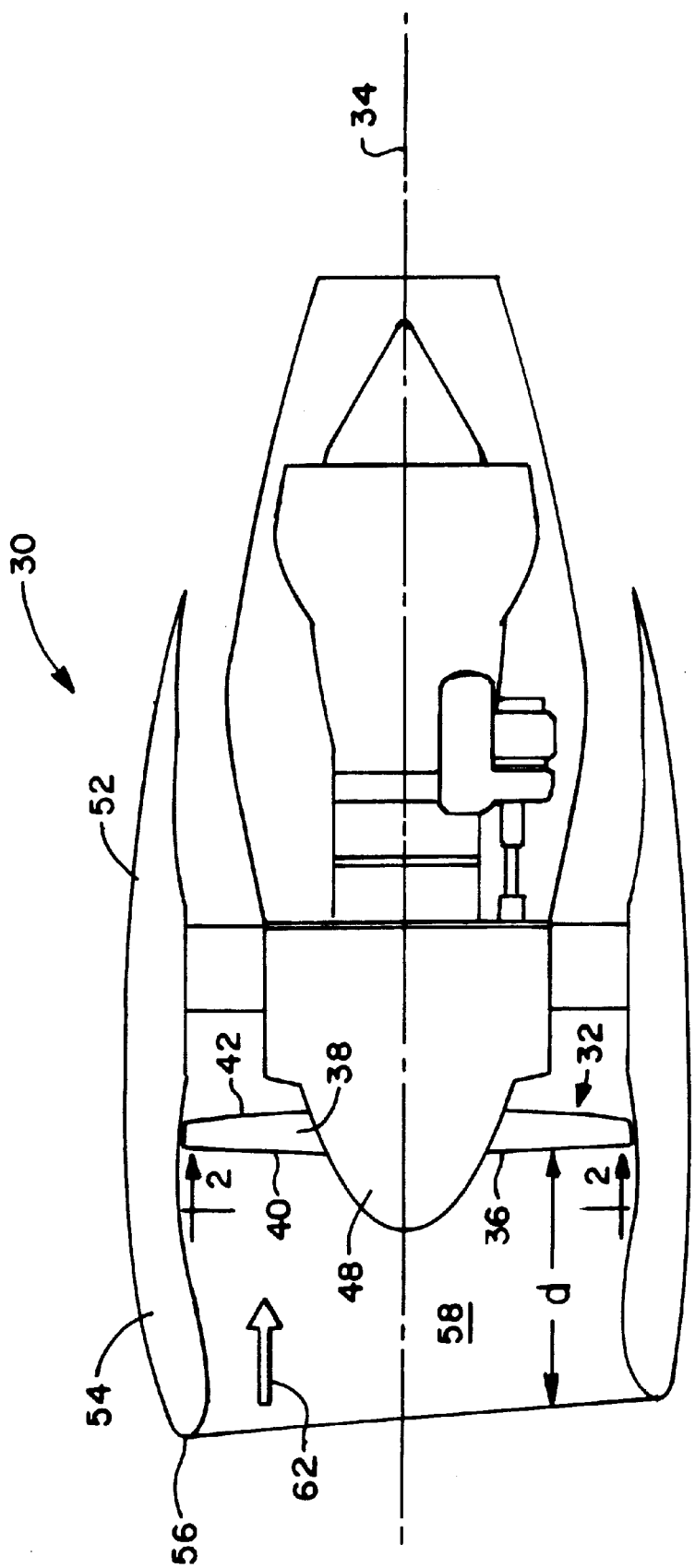
FIG. 1 is a cross sectional schematic side view of a gas turbine engine having a fan blade array and housed within an aerodynamically streamlined nacelle.
Figure 2:
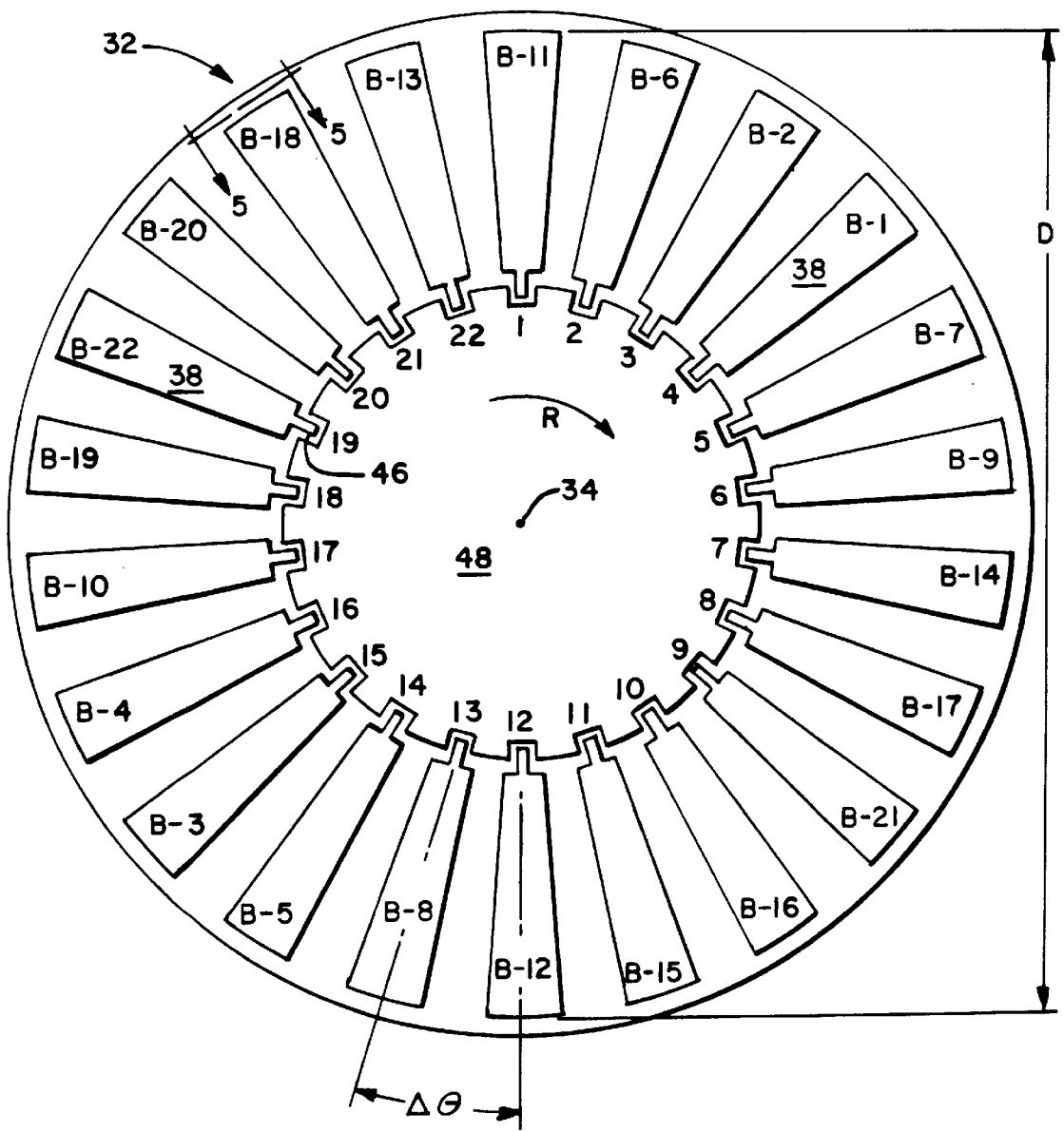
FIG. 2 is a view taken in the direction 2—2 of FIG. 1 showing the fan blade array with the blades distributed according to the present invention.

Referring to FIGS. 1 and 2, an aircraft gas turbine engine 30 includes a fan rotor 32 rotatable about a longitudinally extending axis 34. The fan rotor includes a fan blade array 36 comprising a population of twenty two blades 38 individually designated by letters $B_1$ through $B_{22}$. Each blade has a leading edge 40 and a trailing edge 42 and is secured in one of twenty two retaining slots 46, individually numbered 1 through 22, in a rotor hub 48. The fan rotor has a diameter D which is the distance from a blade tip to the diametrically opposite blade tip.

The engine is housed in an aerodynamically streamlined nacelle 52, the forward portion of which is an inlet 54 having a lip 56 at its forwardmost extremity. The inlet bounds an intake duct 58 and the engine is positioned within the nacelle so that the leading edge of the fan blade array is recessed within the duct by a longitudinal distance d, the distance from the lip to the array leading edge.

During engine operation, the fan rotor rotates about the axis in direction R at a speed N which varies in accordance with the power demands placed on the engine. The rotor rotation and forward velocity of the engine cause ambient air 62 to enter the intake duct and flow through the fan blade array which pressurizes the air for use by other engine components. Immediately forward of the fan blade array, the air has a Mach Number component $M_x$ in the longitudinal direction and is capable of propagating sound or pressure waves at a sonic velocity c. At sufficiently high rotational speeds, the radially outermost portions of the fan blades operate supersonically so that the leading edge of each blade generates an aerodynamic shock.

Referring now to FIGS. 3A through 3C, each blade, as installed in the hub, is ideally identical to every other blade. That is, there are no differences in any physical attributes of the blades 38, such as their shape, position or orientation, that would affect the uniformity of shocks 66 generated near the blade tips. As a result, the shocks 66 are uniformly oriented. Moreover the shocks are of uniform strength and therefore propagate at the same speed. Therefore, an observer positioned forwardly of the blade array perceives a time varying pressure or noise signal, as shown in FIG. 3B, as the propagating shocks arrive at the observer's position. As shown by the spectral diagram of FIG. 3C, the frequency spectrum of the noise signal includes a fundamental frequency equal to the blade passing frequency BPF (i.e. the rate at which fan blades pass an arbitrary angular reference point) and higher order harmonics (integral multiples) of the blade passing frequency.

Figure 4B:
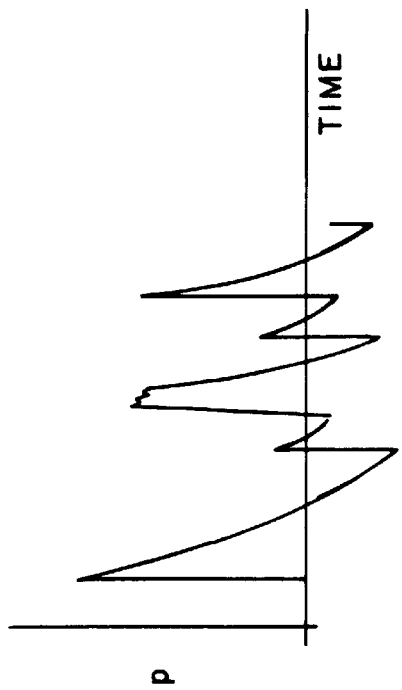
FIGS. 4A, 4B and 4C are, respectively, a schematic, developed view of a portion of a fan blade array having blade-to-blade nonuniformities and showing aerodynamic shocks generated by each blade, a graph of a pressure signal associated with the shocks and a spectral diagram showing the frequency spectrum of the pressure signal.
Figure 4C:
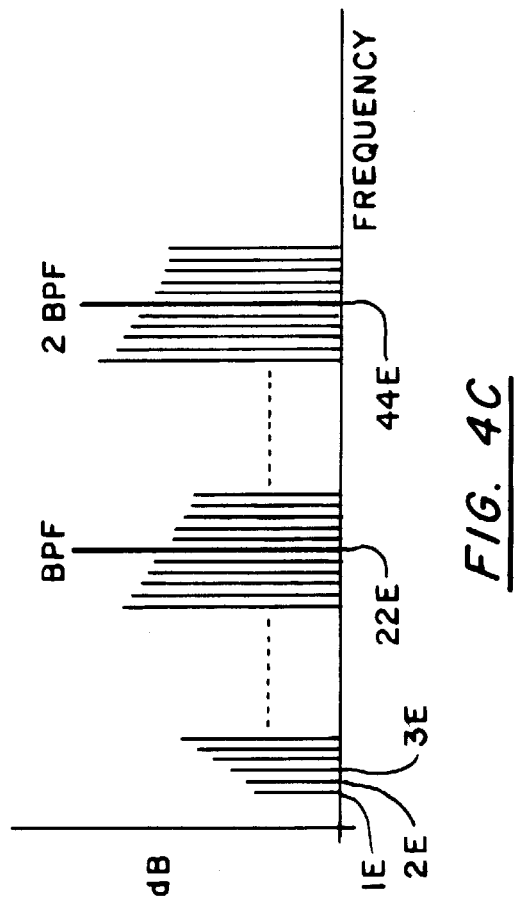
Figure 4A:
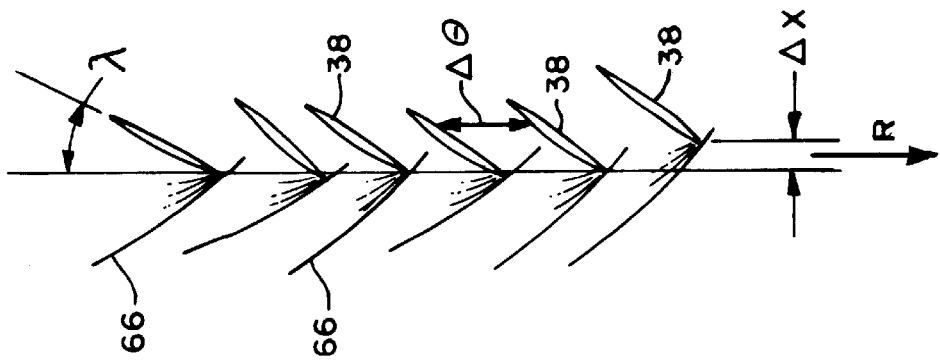
Figure 5:
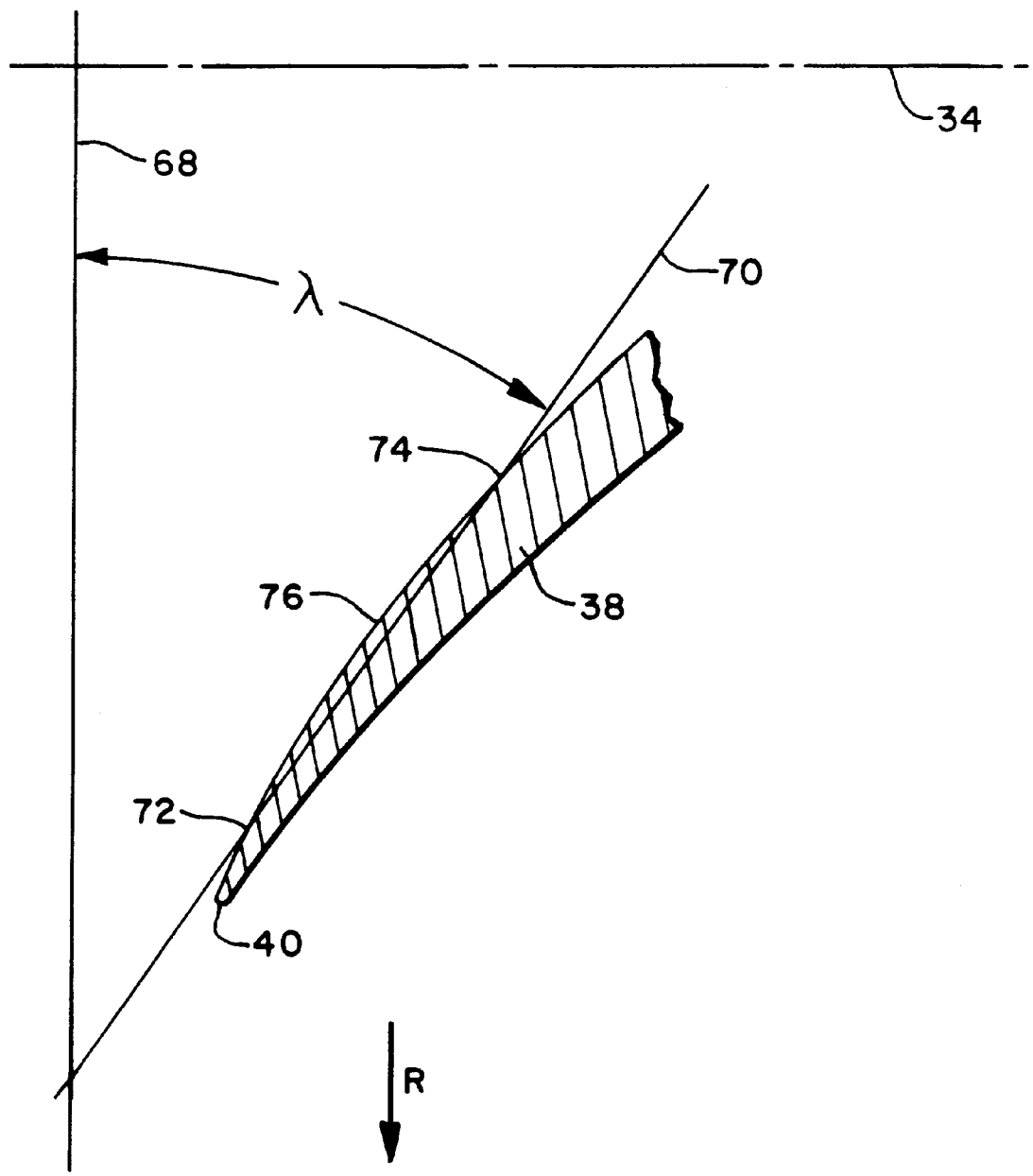
FIG. 5 is a cross sectional view of the leading edge region of a fan blade taken in the direction 5—5 of FIG. 2 and illustrating the definition of leading edge stagger angle, $\lambda$.

In practice, the above described ideal blade array is unachievable. Allowable tolerances in the manufacture and installation of the blades cause each blade to be slightly different from the other blades. For example, FIG. 4A illustrates a blade array exhibiting a number of blade-to-blade physical nonuniformities. These nonuniformities, which are highly exaggerated in the illustration, include differences in the blade leading edge position $\Delta x$, blade angular offset $\Delta\theta$ (seen more clearly in FIG. 2) and blade orientation or pitch angle as determined by leading edge stagger angle $\lambda$. In the context of the present invention, and as illustrated in FIG. 5, leading edge stagger angle is the acute angle between a line 68 perpendicular to the engine axis 34 and a second line 70 through two points 72, 74 on the convexly curved surface 76 of the blade, the points being those at 5% and 30% of the distance along the convex surface 76 between the leading and trailing edges 40, 42.

Due to the aforementioned physical nonuniformities, the shocks 66 generated by the blade leading edges are nonuniformly oriented and are of unequal strength and therefore propagate at different speeds. Consequently some of the shocks overtake other shocks as they propagate forwardly in the intake duct. The shock interactions produce a complex, time varying pressure or noise signal, such as the signal shown in FIG. 4B, that repeats once per rotor revolution. The frequency spectrum of the noise signal is shown in FIG. 4C and contains a fundamental frequency, denoted as 1E in the illustration, of once per rotor revolution (i.e. once per 360°). The spectrum also contains multiple, higher order harmonics of the fundamental frequency (e.g. twice per revolution or 2E, three times per revolution or 3E, etc.) including the blade passing frequency (22 times per revolution) and multiples thereof. Noise having this once-per-revolution fundamental frequency and its higher order harmonics is referred to as combination tone noise or multiple pure tone noise (and is sometimes referred to colloquially as "buzzsaw" noise) and can be highly objectionable to the observer. Physical nonuniformities other than those described above can also contribute to combination tone noise and different types of nonuniformities may contribute unequally to the generation of combination tone noise.

The harmonics shown in FIG. 4C can be categorized as either decay prone or decay resistant. A harmonic is decay prone if its acoustic energy amplitude decays to no more than a predesignated amplitude within a predefined distance from the noise source, in this case within the distance, d from the leading edge of the fan blade array to the inlet lip 56. The predesignated amplitude is specific to each harmonic and is an amplitude that is acoustically unobjectionable to an observer. Collectively, the decay prone harmonics are a consecutive group of harmonics at the low end of the frequency spectrum. The decay prone harmonics include at least the first, or fundamental harmonic, and may include harmonics higher than the first order harmonic. The highest order decay prone harmonic is referred to as the cutoff harmonic or cutoff frequency. Harmonics of order higher than the order of the cutoff harmonic are the decay resistant harmonics. The decay resistant harmonics, unlike the decay prone harmonics, are capable of long distance propagation.

In accordance with the above observation, combination tone noise can be significantly mitigated if at least a portion of the acoustic energy of its noise frequency spectrum is forced out of the decay resistant harmonics and into the decay prone harmonics. The present invention is a fan blade array which exhibits at least one blade-to-blade physical nonuniformity responsible for combination tone noise and whose blades are distributed in a hub to effect the above described allocation of acoustic energy among the combination tone noise harmonics. In particular, the blades are distributed so that the spatial or circumferential spectrum of the physical nonuniformity is dominated by circumferential harmonics whose order is no greater than the order of the cutoff harmonic of the combination tone noise spectrum. In the case of combination tone noise generated by a fan blade array recessed within an engine nacelle, the order of the cutoff harmonic can be predicted from readily determinable physical parameters.

The application of these principles to a gas turbine engine manufactured by the assignee of the invention is now demonstrated. The engine has a fan rotor with twenty two blades as illustrated schematically in FIG. 2. Differences in pitch angle, as indicated by stagger angle $\lambda$, have been determined to be the primary contributor to combination tone noise emitted by this particular engine, and therefore stagger angle is the only physical nonuniformity taken into account in the following demonstration.

The order n of the cutoff harmonic is determined from a relationship which is derivable from the spinning mode theory attributable to J. M. Tyler, T. G. Sofrin and J. C. McCann and documented in their papers ("Axial Flow Compressor Noise Studies", Tyler & Sofrin, Transactions of the S.A.E., Vol. 70, pp 309–332, 1962; and "Pratt & Whitney Experience in Compressor Noise Reduction", Sofrin & McCann, for presentation at the Acoustical Society of America, 72nd Meeting, Los Angeles, Calif., Nov. 2–5, 1966). As explained in the Tyler & Sofrin paper, $M_m$ and $M_m^*$ are the spinning mode tip Mach number and the corresponding Mach number at which a spinning mode transits from decay to propagation. In the case of a duct having air flowing therethrough (discussed in the Sofrin & McCann paper), the transition between decay and propagation occurs when the following ratio is less than 1.0:

$$M_m/\{M_m^*(1.0-M_x^2)^{0.5}\}$$

where $M_x$ is the longitudinal component of Mach Number immediately upstream of the leading edge of the fan blade array.

Table 2 of the Tyler & Sofrin paper also expresses a relationship between $M_m^*$ and a quantity, m, of spinning lobes for several hub-tip ratios, $\sigma$. For a circular duct, $\sigma=0$ and the relationship of Table 2 can be approximated as:

$$M_m^*=1.0+0.81m^{-0.665}.$$

The spinning mode tip Mach number, $M_m$, is $\pi DN/720c$ where D is the rotor diameter (FIG. 2) expressed in inches, N is the rotor angular velocity, expressed in revolutions per minute, at which it is desired to maximize the mitigation of combination tone noise, and c is the local sonic speed immediately upstream of the leading edge of the fan blade array, c being expressed in feet per second. Combining the foregoing, the order of the cutoff harmonic, denoted as n, is:

$$n<(0.81/\{[\pi DN/720c(1-M_x^2)^{0.5}\}-1])^{1.504}.$$

For the engine of interest D equals 112 inches and N equals 2500 revolutions per minute. At the operational conditions of interest, c equals 1117 feet per second and $M_x$ equals 0.5. With these values, the above relationship yields a value of 5.43. Since n is the order of the cutoff harmonic and therefore must be an integer, n is 5, the largest integer no greater than the value determined from the above relationship. In terms of the combination tone noise frequency spectrum, the cutoff frequency corresponds to the fifth harmonic, i.e. to a frequency of five times per revolution or five times per 360°. Thus, the fifth harmonic and all lower order harmonics (i.e. the first through fourth harmonics) are decay prone and decay to an unobjectionable amplitude within the intake duct, i.e. within the distance d (FIG. 1) from the leading edge of the fan blade array to the inlet lip 56. The sixth and higher order harmonics are decay resistant.

Referring to the table of FIG. 6, a population of twenty two fan blades, individually designated by letters $B_1$ through $B_{22}$ and having the indicated stagger angles, is available for distribution in the hub 48 of FIGS. 1 and 2. The stagger angles represent an actual population of blades and are typical of blades manufactured for the engine of interest. When the blades are distributed in the hub, the blades collectively exhibit a spatial distribution, specifically a circumferential distribution, of stagger angle and this circumferential distribution has an associated spatial or circumferential spectrum. According to the invention, the blades are distributed so that the circumferential spectrum of the stagger angle distribution is dominated by desirable circumferential harmonics of order no greater than m where m is an integer no greater than n, the cutoff harmonic of the combination tone noise frequency spectrum. In principle, m can be as large as n. However it is known that the higher order decay prone harmonics of the noise frequency spectrum are less decay prone than their lower order counterparts. In practice, therefore, it is prudent to chose a value of m lower than n. For the specific engine of interest, m is chosen to be two, therefore the blades are distributed in the hub so that the circumferential spectrum of the nonuniformity (stagger angle) is dominated by circumferential harmonics of order no greater than two. In the more general case where multiple nonuniformities are considered, the value of m can be specific to each nonuniformity.

Figure 7A:
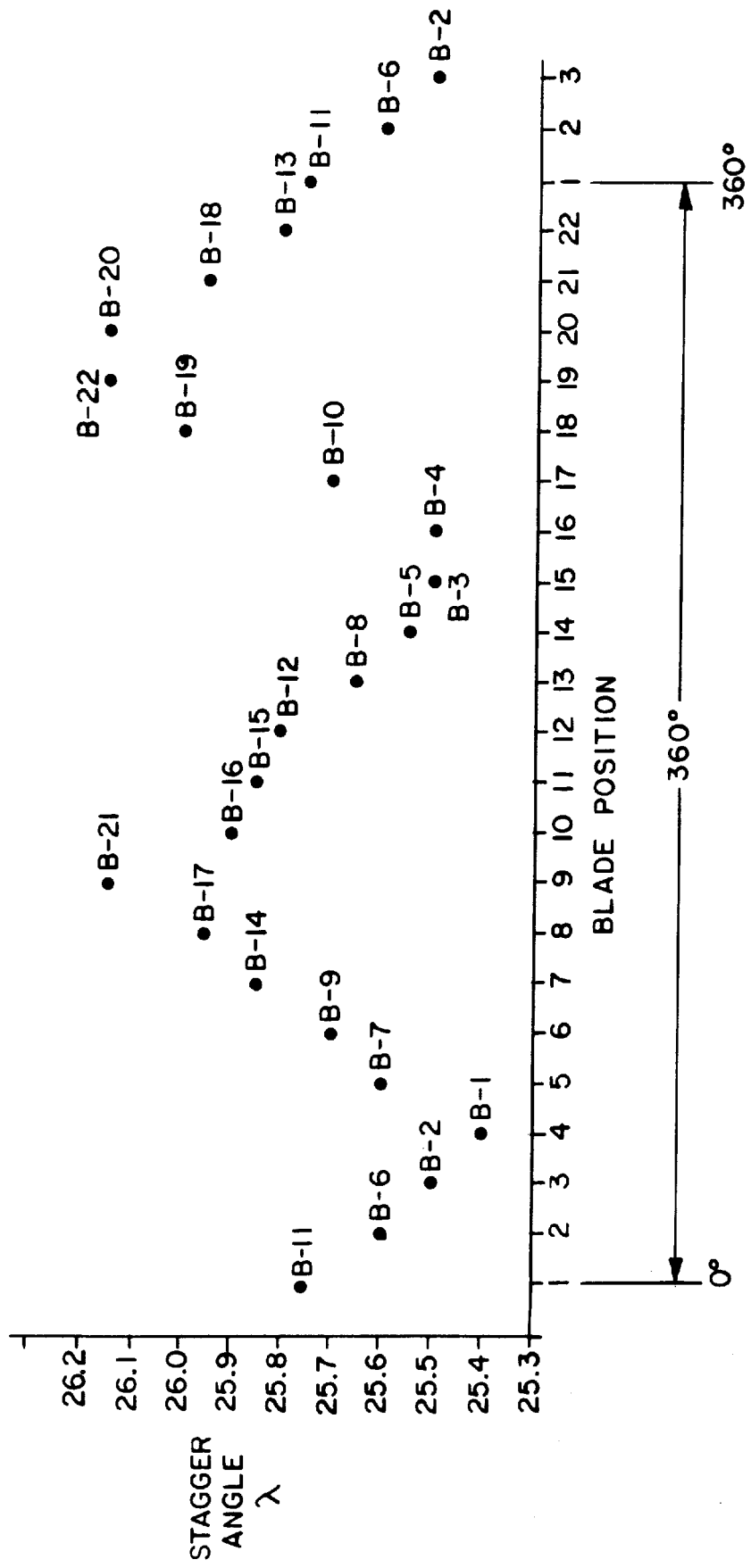
FIGS. 7A, 7B and 7C are, respectively, a graph showing fan blade stagger angle versus circumferential position for a population of blades distributed in a hub according to the present invention, the circumferential spectrum of the stagger angle distribution and the frequency spectrum of combination tone noise emitted by the blade population during engine operation.
Figure 7B:
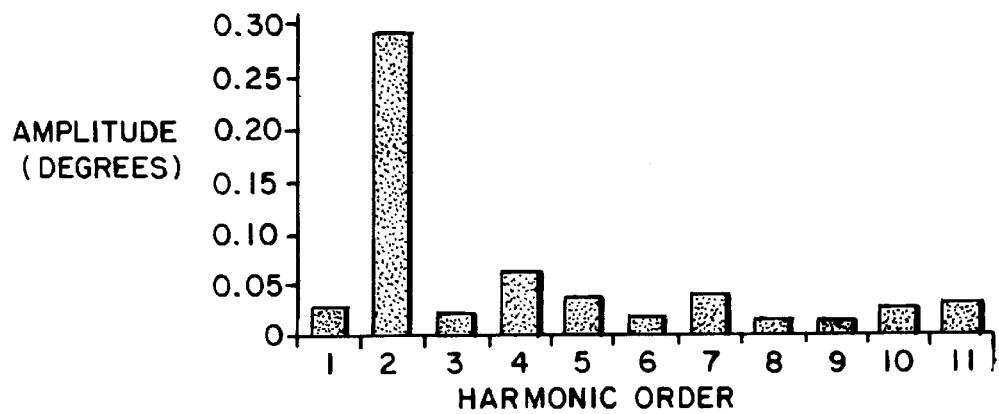
Figure 7C:
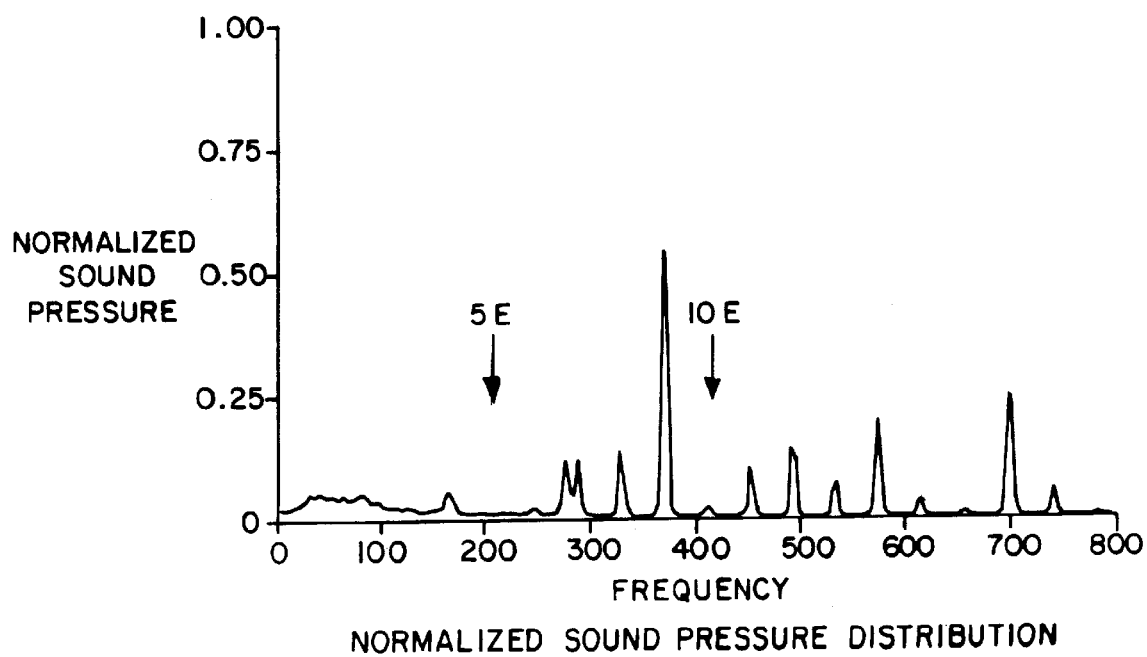

One distribution of blades which satisfies the above condition (that the circumferential spectrum of the stagger angle distribution is dominated by desirable circumferential harmonics of order no greater than two) is indicated by the column labeled "Blade Position for Noise Reduction" in FIG. 6. For example blade $B_1$ is assigned to hub retention slot number 4, blade $B_2$ to slot number 3 and so forth. The complete distribution of blades is illustrated in FIG. 2. FIG. 7A shows the corresponding distribution of stagger angle with circumferential position, and FIG. 7B shows the circumferential spectrum of the stagger angle distribution of FIG. 7A. More specifically, FIG. 7B shows the coefficients, $A_k$ ($A\neq 0$) of the expression:

$$\lambda = A_0 + A_1 \sin(\theta + \phi_1) + A_2 \sin(2\theta + \phi_2) + \ldots + A_{11} \sin(11\theta + \phi_{11})$$

where $\theta$ is the angular location of each blade in the array and $\phi$ is a harmonic-specific phase angle. Harmonics greater than the eleventh order harmonic are not shown since it takes, on average, two blades to define a cycle of stagger angle variation and therefore no more than eleven variation cycles can be defined by a population of 22 blades. FIG. 7C shows the corresponding combination tone noise (sound pressure) spectrum.

Inspection of FIG. 7B reveals that the sum of the desirable (first and second) harmonic amplitudes (approximately 0.32) exceeds the sum of the undesirable (third through eleventh) harmonic amplitudes (approximately 0.29). Moreover, the sum of the desirable harmonic amplitudes is at least three times as large as the largest undesirable harmonic amplitude (i.e. the 0.06 amplitude of the fourth harmonic). Thus, the circumferential spectrum is dominated, as required for mitigation of combination tone noise, by harmonics whose order is no greater than two. In this particular example, the second harmonic happens to be the only significant harmonic and therefore the stagger angle distribution (FIG. 7A) exhibits a periodicity of approximately two times per 360°. In general, a nonuniformity distribution dominated by its kth order circumferential harmonic will exhibit a k times per 360° periodicity (although not all distributions that exhibit a k times per 360° periodicity are necessarily dominated by their kth order circumferential harmonic).

Figure 8A:
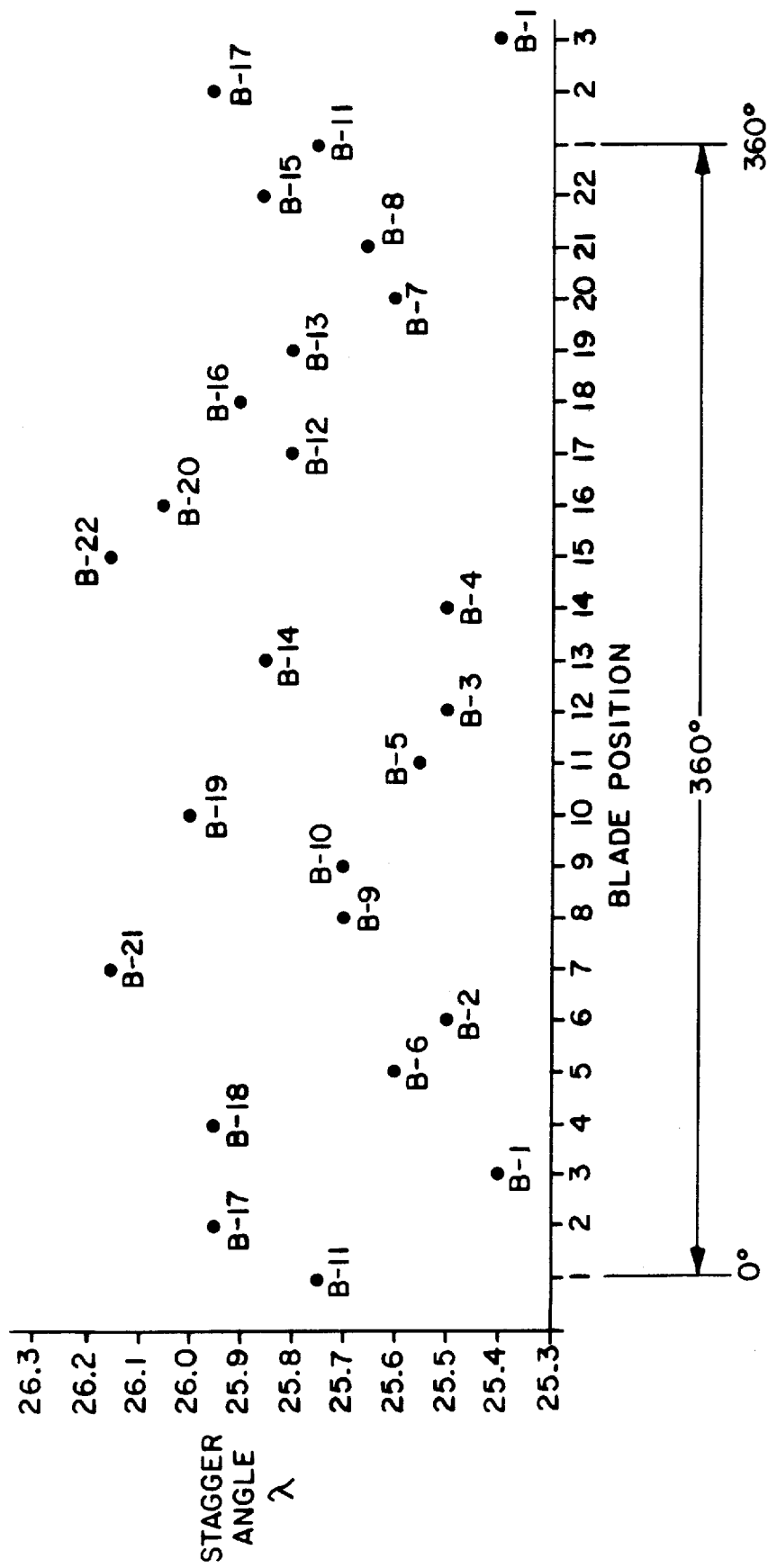
FIGS. 8A, 8B and 8C are, respectively, a graph showing fan blade stagger angle versus circumferential position for a population of blades distributed in a hub according to the prior art, the circumferential spectrum of the stagger angle distribution and the frequency spectrum of combination tone noise emitted by the blade population during engine operation.
Figure 8B:
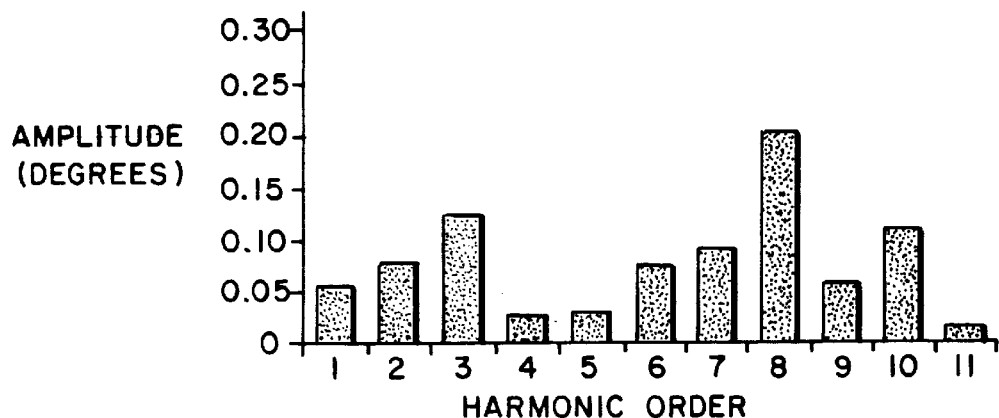
Figure 8C:
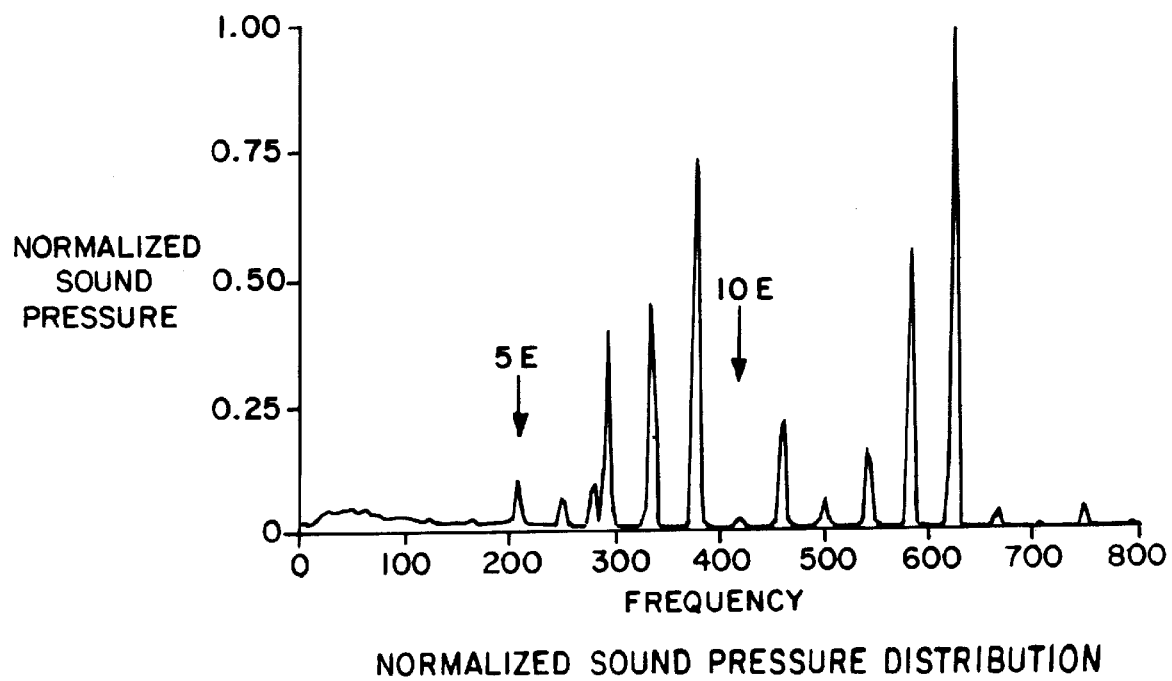

The effectiveness of the above described blade distribution in defeating combination tone noise is demonstrated by comparing FIGS. 7A through 7C to FIGS. 8A through 8C. FIGS. 8A through 8C show the stagger angle distribution, circumferential spectrum and combination tone noise (sound pressure) spectrum for a rotor using the same population of blades shown in FIG. 6, but with those blades distributed, as shown in the last column of FIG. 6, without regard for combination tone noise mitigation. The stagger angle distribution of FIG. 8A, unlike that of FIG. 7A, does not exhibit any observable periodicity, and the circumferential spectrum of FIG. 8B does not reveal the domination of the desirable (second order and lower) harmonics evident in FIG. 7B. The sum of the desirable harmonic amplitudes (0.13) is only a fraction of the sum of the undesirable harmonic amplitudes (0.71), and the sum of the desirable harmonic amplitudes is only substantially equal to the largest undesirable harmonic amplitude (i.e. the 0.12 amplitude of the third harmonic). The effect on combination tone noise is clearly seen by comparing the noise spectra of FIGS. 7C and 8C (to facilitate the comparison, the spectra are normalized to the maximum sound pressure observed with a prior art blade distribution, specifically the blade distribution of the last column of FIG. 6). Those spectra show that with the blades distributed as prescribed by the invention, a significant amount of acoustic energy has been forced out of the higher order decay resistant noise harmonics. The energy has been distributed among the lower order, decay prone harmonics. Because the decay prone harmonics decay in the intake duct rather than propagating outside the duct, they are not evident in FIG. 7C nor are they perceived by an observer outside the duct.

One way to assess whether or not a circumferential spectrum is dominated by desirable circumferential harmonics (i.e. those of order no greater than m) is to use the previously mentioned observation that a stagger angle distribution (or any other nonuniformity distribution) having a periodicity of k times per 360° may be dominated by the kth circumferential harmonic. For example, if the highest order desirable harmonic, m, is chosen to be three, then the blades should be distributed in the array so that their stagger angles exhibit a periodicity of approximately three times per 360°. Since the periodicity suggests, but does not guarantee the dominance of the third circumferential harmonic, a spectral content analysis of the stagger angle distribution is advisable to verify the subordinance of the undesirable harmonics. As is well known, the likelihood that the third harmonic will be dominant is improved if the stagger angles vary smoothly and non-abruptly with respect to angular location. Expressed more rigorously, if the stagger angle $\lambda$ is expressed as a continuous function of angular location $\theta$, the derivatives $d^N\lambda/d\theta^N$ should not be discontinuous or change abruptly with respect to angular location.

Figure 9:
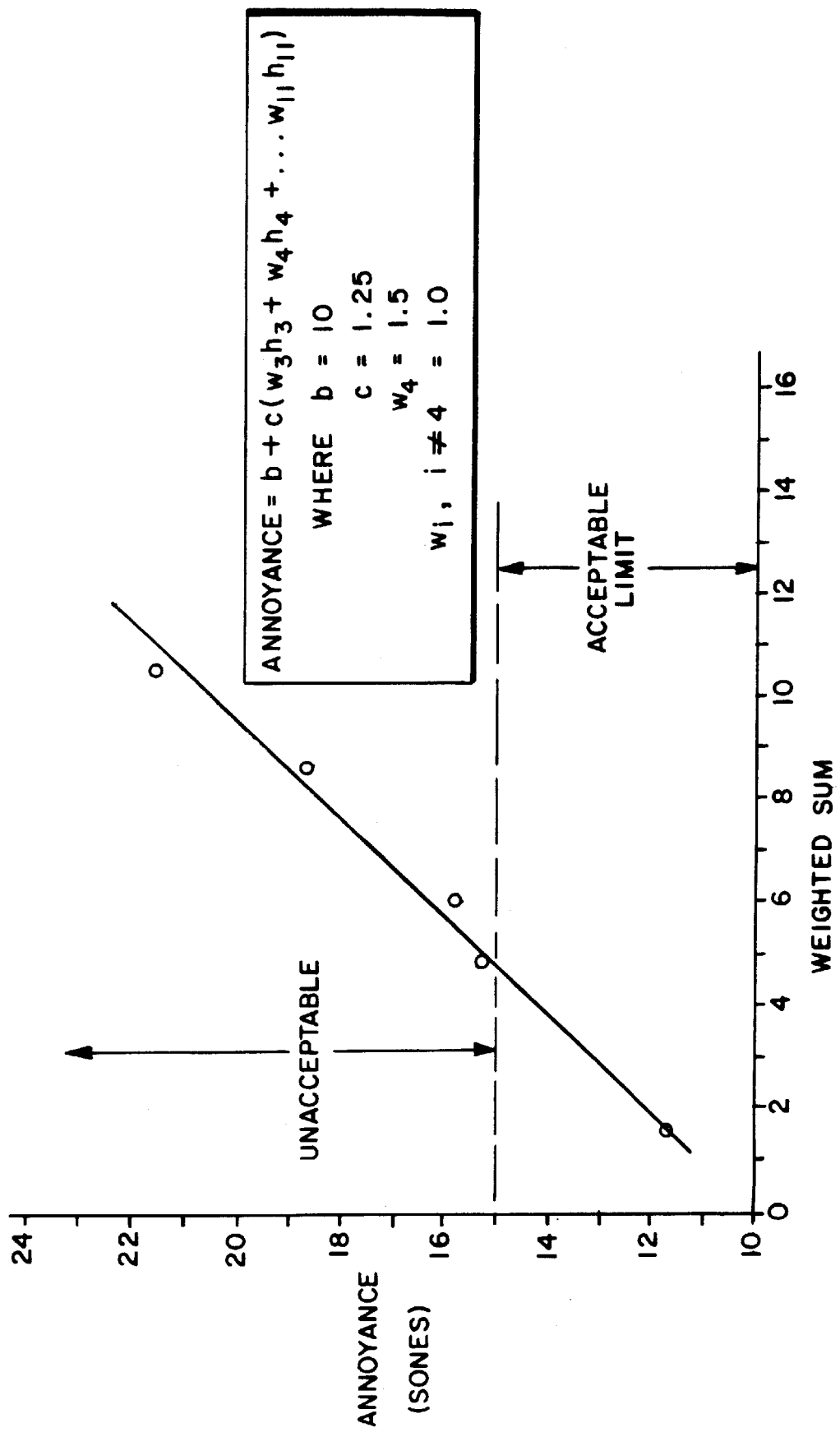
FIG. 9 is a graph showing noise as a function of a weighted sum of the circumferential harmonics of a stagger angle distribution.

A more reliable way to ensure that a circumferential spectrum is dominated by desirable circumferential harmonics is to assign a non-zero weighting factor to each undesirable circumferential harmonic (those of order greater than m) and multiply the amplitude of each undesirable harmonic by its assigned weighting factor. If the sum of the weighted amplitudes is no greater than a specified amplitude threshold, then the blade distribution corresponding to the circumferential spectrum is considered to be dominated by the desired circumferential harmonics. The weighting factors reflect the relative undesirability of the circumferential harmonics and the amplitude threshold is selected so that the combination tone noise produced by the blade array is acceptable to an observer. A relationship which correlates such a weighted sum to a quantifiable level of annoyance (expressed in units known as "sones") is shown in FIG. 9. The weighting factors reflected in the weighted sum are 1.875 for the fourth harmonic and 1.25 for the third and fifth through eleventh harmonics. For the specific engine under consideration, it has been found that these weighting factors facilitate the identification of blade distributions that not only mitigate combination tone noise, but also satisfy rotor imbalance limits.

Another way to ensure dominance of the desirable harmonics is to evaluate the weighted sum for a number of candidate blade distributions and select the blade distribution corresponding to the minimum of those weighted sums. For blade arrays having small quantities of blades, it may be feasible to evaluate the weighted sum for all possible distributions, and thereby identify an absolute minimum weighted sum. For arrays having large numbers of blades, such as the 22 blade array of the foregoing example, the effort to evaluate all possible blade distributions exceeds the capabilities of currently available computational tools. Therefore it is more practical to evaluate a subset of all possible blade distributions and select the minimum weighted sum from the subset. Such quasi-minimization not only brings the scope of the effort within the grasp of existing computational tools, but is also highly successful in identifying blade distributions whose combination tone noise emissions are acceptable.

In practice, the distribution of blades in a hub must respect considerations other than the mitigation of combination tone noise. For example, fan blades typically exhibit variations in both mass and center of gravity. If such blades are distributed without regard for the mass and center of gravity differences, the rotor is likely to be unbalanced and will vibrate excessively during engine operation. There is, however, no fundamental conflict between distributing the blades to mitigate combination tone noise and distributing the blades to achieve acceptable levels of imbalance—some of the possible blade distributions which effectively mitigate combination tone noise will also be balanced so that both requirements can be satisfied simultaneously. The blade distribution of FIG. 7A represents just such a simultaneous satisfaction of both balance and noise considerations. The imbalance is undoubtedly greater than it could have been if combination tone noise considerations had been ignored, but nevertheless is within acceptable limits. Likewise, the decay prone first and second circumferential harmonics could have been made even more dominant if balance considerations had been disregarded, or if a less stringent balance limit had been observed.

The determination of a blade distribution that effectively mitigates combination tone noise is done most efficiently by a computer executed algorithm. At a minimum, the algorithm identifies a blade distribution whose circumferential nonuniformity spectrum is dominated by the desirable circumferential harmonics. Domination of the desirable harmonics can be ensured by specifying a threshold amplitude for the weighted sum of the undesirable harmonics, by absolutely minimizing or quasi-minimizing the weighted sum of the undesirable harmonics, or by applying any other criterion which ensures that combination tone noise generated by the blade array is acceptable to an observer. In the event that multiple physical nonuniformities are determined to contribute significantly to the generation of combination tone noise, the algorithm can identify blade distributions in which the circumferential spectrum of each nonuniformity is dominated by desirable harmonics, and the highest order desirable harmonic can be specific to each nonuniformity. Moreover, the influence of each nonuniformity can be weighted to reflect its relative contribution to combination tone noise and therefore the extent to which that nonuniformity affects the blade distribution. For example if stagger angle, blade leading edge position and blade angular offset are all non-negligible contributors to combination tone noise, the highest order desirable harmonic orders m might be chosen to be 2, 3 and 2 respectively and the nonuniformities might be weighted 80%, 15% and 5% respectively.

A computer executed algorithm can also easily identify blade distributions that simultaneously satisfy multiple constraints, for example combination tone noise mitigation and rotor balance requirements. One algorithm which has been found useful for satisfying such multiple constraints is described in U.S. Pat. No. 5,537,861, the contents of which are incorporated herein by reference. That patent describes a method for balancing a bladed rotor by assigning "penalties" to a number of candidate blade distributions. One of these penalties can be the weighted sum of the undesirable harmonics or another convenient measure of the combination tone noise producing potential of each candidate distribution. When using the algorithm in this manner, the resultant blade distributions reflect both balance and combination tone noise considerations.

We claim:

1. A bladed rotor for a turbine engine, the rotor including a hub rotatable about a longitudinally extending axis and a population of blades circumferentially distributed in the hub at discrete angular locations and extending from the hub, the blades having at least one circumferentially varying physical nonuniformity which contributes to combination tone noise, the combination tone noise having a noise frequency spectrum one of whose harmonics is a cutoff harmonic of order n, n being a positive integer, the variation of each physical nonuniformity with respect to angular location having a circumferential nonuniformity spectrum, the rotor characterized in that the blades are distributed in the hub so that each circumferential nonuniformity spectrum is dominated by circumferential harmonics of order no greater than m, m being an integer specific to each nonuniformity and no greater than n so that the combination tone noise is mitigated.

2. The bladed rotor of claim 1 the blades being recessed within a duct having a lip, the rotor having a diameter D and a rotor rotational speed N at which it is desired to mitigate combination tone noise, air entering the intake having a longitudinal Mach number component of $M_x$ and a sonic velocity c, the rotor characterized in that n is the largest integer no greater than:

$$(0.81/\{[\pi DN/720c\ (1-M_x^2)^{0.5}]-1\})^{1.504}$$

where D is expressed in inches, N is expressed in revolutions per minute, and c is expressed in feet per second.

3. The bladed rotor of claim 1 each blade having a pitch angle, a leading edge position and an angular offset relative to a circumferentially adjacent blade in the rotor, characterized in that the physical nonuniformity is at least one of the pitch angle, the blade leading edge longitudinal position and the angular offset between circumferentially adjacent blades.

4. The bladed rotor of claim 3 characterized in that the physical nonuniformity is the pitch angle and m is two.

5. The bladed rotor of claim 1 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes is no greater than a specified amplitude threshold to ensure that the noise frequency spectrum is dominated by harmonic frequencies no greater than the cutoff frequency.

6. The bladed rotor of claim 1 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes of the blades as distributed in the hub is the minimum of the weighted amplitudes of all possible blade distributions.

7. The bladed rotor of claim 1 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes of the blades as distributed in the hub is the minimum of the weighted amplitudes of a subset of all possible blade distributions.

8. The bladed rotor of claim 1 characterized in that the blades are distributed in the hub so that each nonuniformity exhibits a periodicity, with respect to angular location, of approximately m times per 360°, m being an integer specific to each nonuniformity and no greater than n so that combination tone noise is mitigated.

9. The bladed rotor of claim 8 characterized in that each nonuniformity is expressible as a continuous function of angular location, the continuous function has one or more nonzero derivatives, and the derivatives are nondiscontinuous and do not change abruptly with respect to angular location.

10. A method of minimizing combination tone noise generated by a bladed rotor having a hub, which is rotatable about a longitudinally extending central axis, and a population of blades circumferentially distributed in the hub at discrete angular locations and extending from the hub, the blades having at least one circumferentially varying physical nonuniformity which contributes to combination tone noise, the combination tone noise having a noise frequency spectrum one of whose harmonics is a cutoff harmonic of order n, n being a positive integer, the method characterized by:

quantifying the physical nonuniformities; and distributing the blades in the rotor so that the variation of each nonuniformity with respect to angular location has a circumferential nonuniformity spectrum which is dominated by circumferential harmonics of order no greater than m, m being an integer specific to each nonuniformity and no greater than n so that the combination tone noise is mitigated.

11. The method of claim 10 the blades being recessed within a duct having a lip, the rotor having a diameter D and a rotor rotational speed N at which it is desired to mitigate combination tone noise, air entering the intake having a longitudinal Mach number component of $M_x$ and a sonic velocity c, the rotor characterized in that n is the largest integer no greater than:

$$(0.81/\{[\pi DN/720c(1-M_x^2)^{0.5}]-1\})^{1.504}$$

where D is expressed in inches, N is expressed in revolutions per minute, and c is expressed in feet per second.

12. The method of claim 10 each blade having a pitch angle, a leading edge position and an angular offset relative to a circumferentially adjacent blade in the rotor, characterized in that the physical nonuniformity is at least one of the pitch angle, the blade leading edge position and the angular offset between circumferentially adjacent blades.

13. The method of claim 12 characterized in that the physical nonuniformity is the pitch angle and m is two.

14. The method of claim 10 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes is no greater than a specified amplitude threshold to ensure that the noise frequency spectrum is dominated by harmonic frequencies no greater than the cutoff frequency.

15. The method of claim 10 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes of the blades as distributed in the hub is the minimum of the weighted amplitudes of all possible blade distributions.

16. The method of claim 10 characterized in that an amplitude is associated with each circumferential harmonic and a non-zero weighting factor is assigned to each circumferential harmonic of order greater than m, the product of each amplitude and its assigned non-zero weighting factor is a weighted amplitude, and the blades are distributed in the hub so that the sum of the weighted amplitudes of the blades as distributed in the hub is the minimum of the weighted amplitudes of a subset of all possible blade distributions.

17. The method of claim 10 characterized in that the blades are distributed in the hub so that each nonuniformity exhibits a periodicity, with respect to angular location, of approximately m times per 360°, m being an integer specific to each nonuniformity and no greater than n so that combination tone noise is mitigated.

18. The method of claim 17 characterized in that each nonuniformity is expressible as a continuous function of angular location, the continuous function has one or more nonzero derivatives, and the derivatives are nondiscontinuous and do not change abruptly with respect to angular location.

19. A method of minimizing combination tone noise generated by a bladed rotor having a hub, which is rotatable about a longitudinally extending central axis, and a population of blades circumferentially distributed in the hub at discrete angular locations and extending from the hub, the blades having at least one circumferentially varying physical nonuniformity which contributes to combination tone noise, the combination tone noise having a noise frequency spectrum one of whose harmonics is a cutoff harmonic of order n, n being a positive integer, the method characterized by:

establishing the order n of the cutoff harmonic;

quantifying the physical nonuniformities; and distributing the blades in the rotor so that the variation of each nonuniformity with respect to angular location has a circumferential nonuniformity spectrum which is dominated by circumferential harmonics of order no greater than m, m being an integer specific to each nonuniformity and no greater than n so that the combination tone noise is mitigated.

* * * * *